(12) United States Patent
Ohura et al.

(10) Patent No.: US 6,534,948 B2
(45) Date of Patent: Mar. 18, 2003

(54) MOTOR DRIVING CIRCUIT, A METHOD FOR DRIVING A MOTOR, AND A SEMICONDUCTOR INTEGRATED CIRCUIT DEVICE

(75) Inventors: Hitoshi Ohura, Mito (JP); Tsuyoshi Tanaka, Hitachi (JP); Yukio Kawabata, Hitachinaka (JP)

(73) Assignees: Hitachi, Ltd., Tokyo (JP); Hitachi Haramachi Electronics Co., Ltd., Ibaraki (JP)

( * ) Notice: Subject to any disclaimer, the term of this patent is extended or adjusted under 35 U.S.C. 154(b) by 0 days.

(21) Appl. No.: 09/790,203

(22) Filed: Feb. 21, 2001

(65) Prior Publication Data

US 2001/0040440 A1 Nov. 15, 2001

(30) Foreign Application Priority Data

Feb. 29, 2000 (JP) ........................................ 2000/058021

(51) Int. Cl.[7] ................................................ H02P 5/28
(52) U.S. Cl. ........................ 318/798; 318/254; 318/268; 318/801; 318/811; 388/804; 388/811; 388/819
(58) Field of Search ................................ 318/254, 268, 318/798, 801, 811; 388/804, 811, 819

(56) References Cited

U.S. PATENT DOCUMENTS 4,855,652 A * 8/1989 Yamashita et al. .......... 318/268
5,194,794 A * 3/1993 Shamato ..................... 318/603
5,463,299 A * 10/1995 Futami et al. ............... 318/618
5,859,512 A * 1/1999 Buthker ...................... 318/254
5,914,582 A * 6/1999 Takamotot et al. .......... 318/801
6,060,859 A * 5/2000 Jonokuchi ................... 318/801
6,091,216 A * 7/2000 Takahashi et al. ........... 318/254
6,198,240 B1 * 3/2001 Notohara et al. ............ 318/268

* cited by examiner

Primary Examiner—Robert E. Nappi
Assistant Examiner—Rina I. Duda
(74) Attorney, Agent, or Firm—Hogan & Hartson, LLP

(57) ABSTRACT

A motor driving system is disclosed. The circuit includes a power converter for supplying a brushless motor having a permanent magnetic rotor with pulse-width modulation controlled driving power, a magnetic-pole position detector for detecting a magnetic-pole position of the motor rotor, a speed detector for detecting a rotational speed of the motor according to an output signal of the magnetic-pole position detector, a speed controller for outputting a deviation of an output signal of the rotational speed detector from a speed instruction, an instruction signal generating circuit for generating a plurality of instruction signals in response to an output signal of the speed controller, a circuit for generating modulated waves by selecting one of the plurality of instruction signals according to the magnetic-pole position of the motor, and a driving ct for controlling the power converter by means of pulse width modulation according to the modulated waves.

28 Claims, 9 Drawing Sheets

POSITION DETECTING SIGNAL h

SIGNAL DISTRIBUTION OUTPUT (ON AT H)

F I G. 7
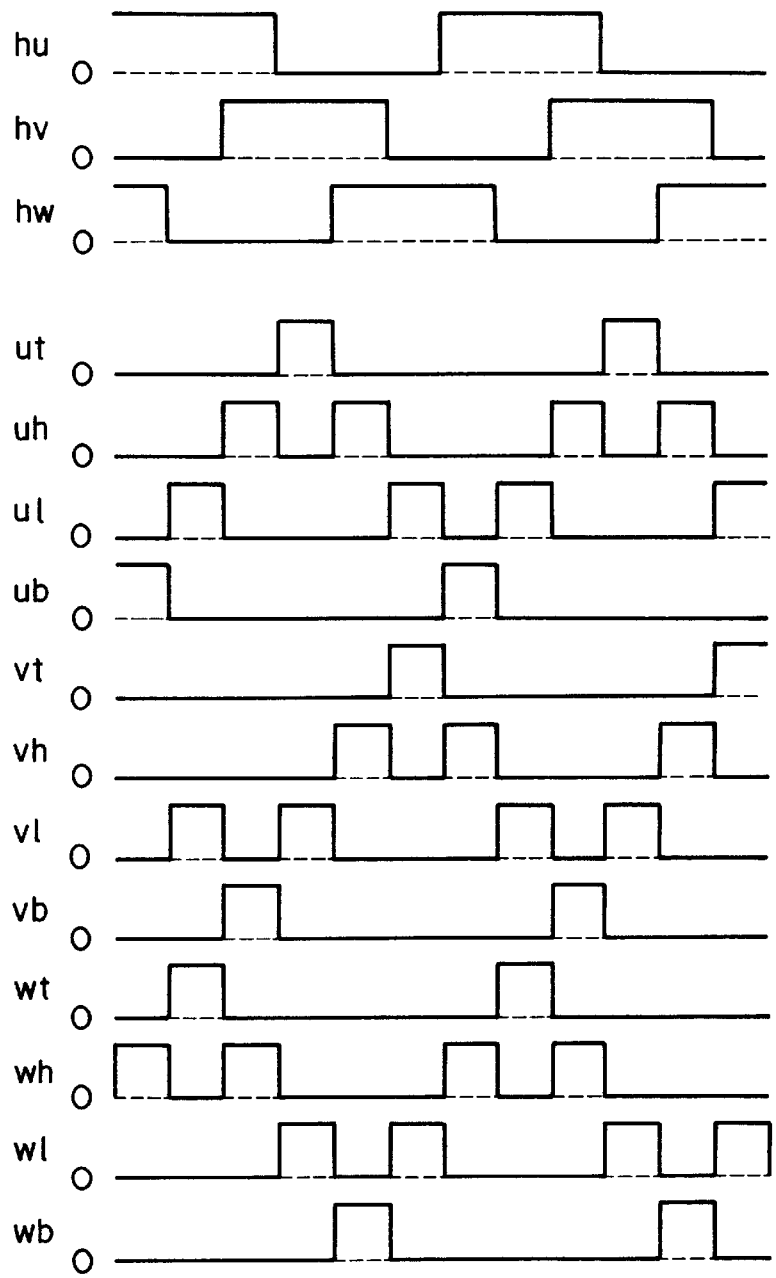

MOTOR DRIVING CIRCUIT, A METHOD FOR DRIVING A MOTOR, AND A SEMICONDUCTOR INTEGRATED CIRCUIT DEVICE

BACKGROUND OF THE INVENTION

In recent years, in the technical field of circuits and semiconductor devices for driving a motor in a home electric appliance or an industrial facility, a method, by which rectified voltage from commercial power supply or direct-current voltage corresponding to it is applied to a motor directly through an inverter in order to drive the motor, comes into wider use. This method is mainly used for the purpose of achieving high efficiency and miniaturization of the motor. Driving a motor at a high voltage decreases consumed current and prevents a loss, caused by internal resistance or the like, from increasing. In addition, it is possible to make a wiring diameter of motor winding small, which contributes to miniaturization of the motor.

Because driving a brushless motor requires an inverter unit, it is desired that an inexpensive inverter unit is supplied in the field of home electric appliances. For this reason, in an inverter driving unit for the brushless motor, an inexpensive 120-degree energizing method is used. This method permits a simple circuit configuration, and is capable of achieving relatively high motor-efficiency.

As regards a motor driving circuit by means of the 120-degree energizing method, a motor is driven in the following manner: a magnetic-pole position of a motor rotor is detected by a magnetic-pole detector; on/off state of each switching element of an inverter unit is controlled in response to the time at which a magnetic pole of the rotor matches with that of a stator. The magnetic-pole position of the rotor is detected using a Hall generator to which Hall effect is generally applied, or using a Hall IC that has an amplifier embedded in a Hall element. As regards this detected signal, 120 degrees out of 180 degrees, which are expressed in electrical angle, is logically switched on for energizing. That is to say, the remaining 60 degrees perform operation of switching off inverter output. Because of it, current immediately after motor current i has been switched on/off shows a current waveform with extremely large variations (di/dt). This di/dt vibrates motor winding, which causes electromagnetic sound to be emitted outside. A frequency of this electromagnetic sound is proportional to a motor rotational frequency and the number of motor poles. Because the frequency ranges from several Hz to several hundred Hz in a rotation range of actual motor use, the sound becomes audible noise.

In addition, if a motor current waveform includes a large amount of harmonic content, motor torque generally tends to cause ripples. Because the motor torque is a product of motor-specific inductive voltage and motor current, ripples of the motor torque depend on the motor current waveform to a large extent. The torque ripples vibrate the motor itself, which causes a base to which the motor is mounted to vibrate. As a result, a noise is generated.

As a method for reducing the noise, there is a method in which motor driving current is made sinusoidal by means of so called PWM (Pulse Width Modulation) control. Specifically, sinusoidal signal is obtained by detecting magnetic flux of a magnetic pole of a motor stator using a Hall element. This sinusoidal signal is compared with a carrier wave signal, which is an output signal of a carrier wave generator, by a comparator to obtain a PWM signal. On-off control of the inverter unit by the PWM signal keeps motor current in a sinusoidal state. However, if advanced operation is required, there is a problem in that a system becomes more complicated and more expensive than the system using the 120-degree energizing method.

SUMMARY OF THE INVENTION

The present invention has been devised by taking the above-mentioned problem into account, and provides a motor driving circuit that has a relatively simple circuit and that generates a low noise.

A motor driving circuit or a driving method comprises the steps of: generating a plurality of instruction signals in response to a motor rotational speed; and selecting one of the plurality of instruction signals according to a magnetic-pole position of a motor, to generate modulated waves. Controlling a power converter, which is used to supply the motor with driving power, by means of the pulse width modulation according to the modulated waves reduces a noise caused by the motor. As a plurality of instruction signals, a direct-current signal that keeps a level proportional to the rotational speed in response to the speed is used. In this case, the modulated waves have a waveform with a level that corresponds to the direct-current level (for example, a stepped waveform). An inverter or the like is used as a power converter. The inverter converts direct-current power to alternating-current power by on-off control of semiconductor switching element.

In the present invention, a low-noise motor driving circuit is integrated into a single semiconductor chip monolithically. The monolithic semiconductor integrated circuit can be built into an enclosure of the motor together with a magnetic-pole position detector. In this connection, the motor driving circuit according to the present invention may be mounted outside the motor enclosure, or may be accommodated inside a resin case to modularize it. Additionally, the motor may be driven in a manner that estimates a magnetic-pole position without using the magnetic-pole position detector, or the like; what is called, in a sensor-less manner.

BRIEF DESCRIPTION OF THE DRAWINGS

FIG. 7 illustrates a logical configuration of a signal distribution circuit shown in FIG. 6;

DESCRIPTION OF THE PREFERRED EMBODIMENT

Preferred embodiments of the present invention will be described in detail with reference to the drawings.

(Embodiment 1)

Figure 1:
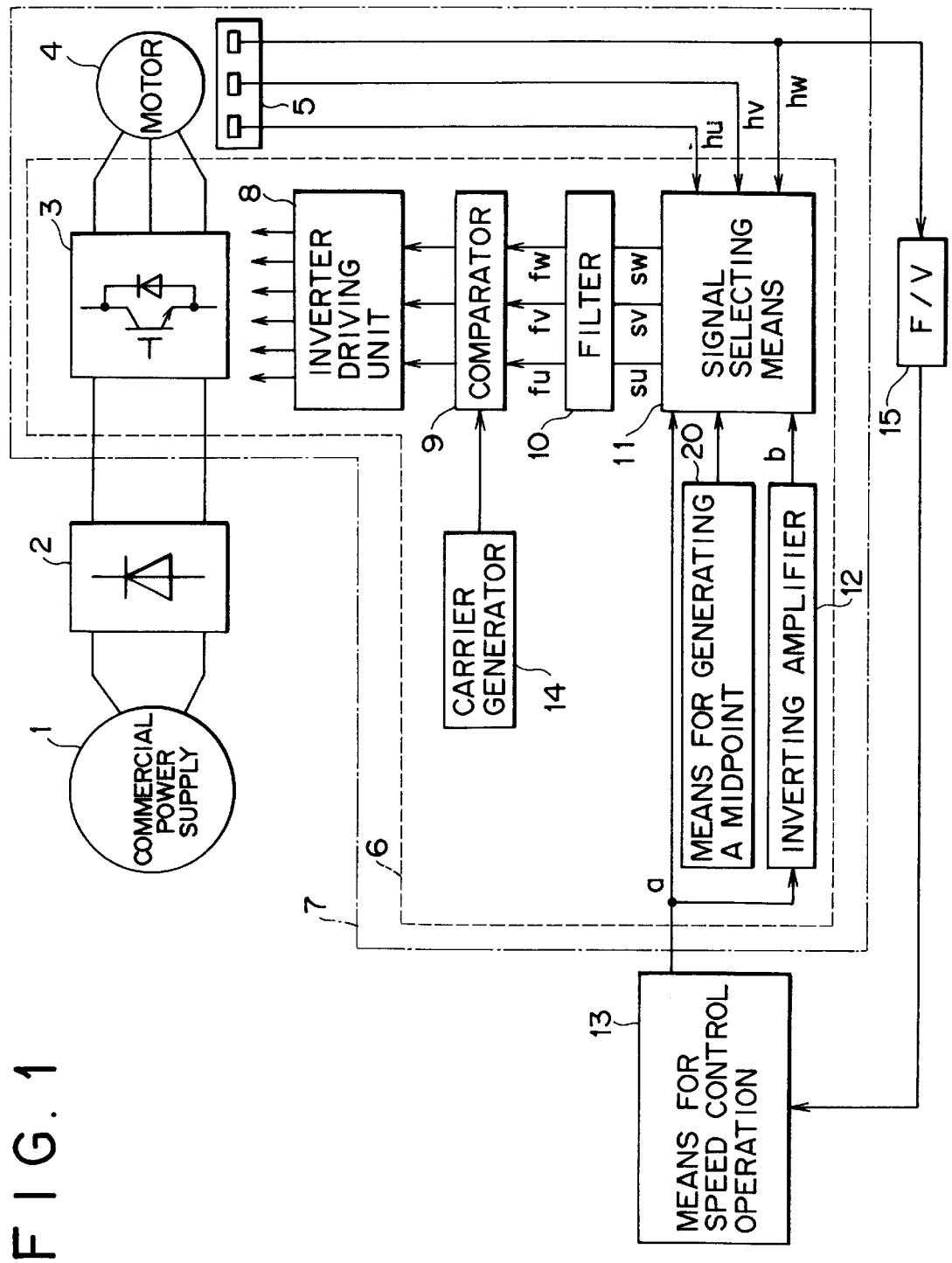
FIG. 1 illustrates a motor driving circuit and a motor driving system according to embodiment 1.

FIG. 1 illustrates a motor driving system comprising a motor driving circuit and a motor of this embodiment. In FIG. 1, a motor 4 is a three-phase brushless motor. This motor comprises a permanent magnet embedded in a rotor, and a magnetic-pole position detector 5 that detects magnetic flux generated by the permanent magnet to detect a magnetic-pole position of the rotor. In this embodiment, a Hall IC is used as the magnetic-pole position detector 5. The Hall IC incorporates a Hall element, and a zero-crossing circuit that converts detected signals, which are output by the Hall element, to logical signals (hu, hv, hw). Each phase is handled by one magnetic-pole position detector 5. The magnetic-pole position detectors 5 are provided so that a phase difference between electrical angles for each of the three phases becomes 120 degrees.

An input terminal of the motor, that is, winding of the motor stator is connected to an inverter unit 3. The inverter unit 3 comprises a circuit in which six switching elements such as, for example, power MOSFET and IGBT (Insulated Gate Bipolar Transistor) are combined. Direct-current power supply used as power supply of the inverter unit 3 is obtained by rectifying an alternating-current commercial power supply 1 using a rectifier 2. An inverter driving unit 8 controls on/off state of each switching element of the inverter unit 3.

By the way, a driving circuit 6 enclosed by a dotted line shown in FIG. 1 is formed in a monolithic semiconductor integrated circuit device. In addition, the driving circuit 6 enclosed by a dash-dot line and the magnetic-pole position detector 5 are incorporated in the motor 4. They are integrated as a brushless motor with a built-in driving circuit 7.

Figure 2:
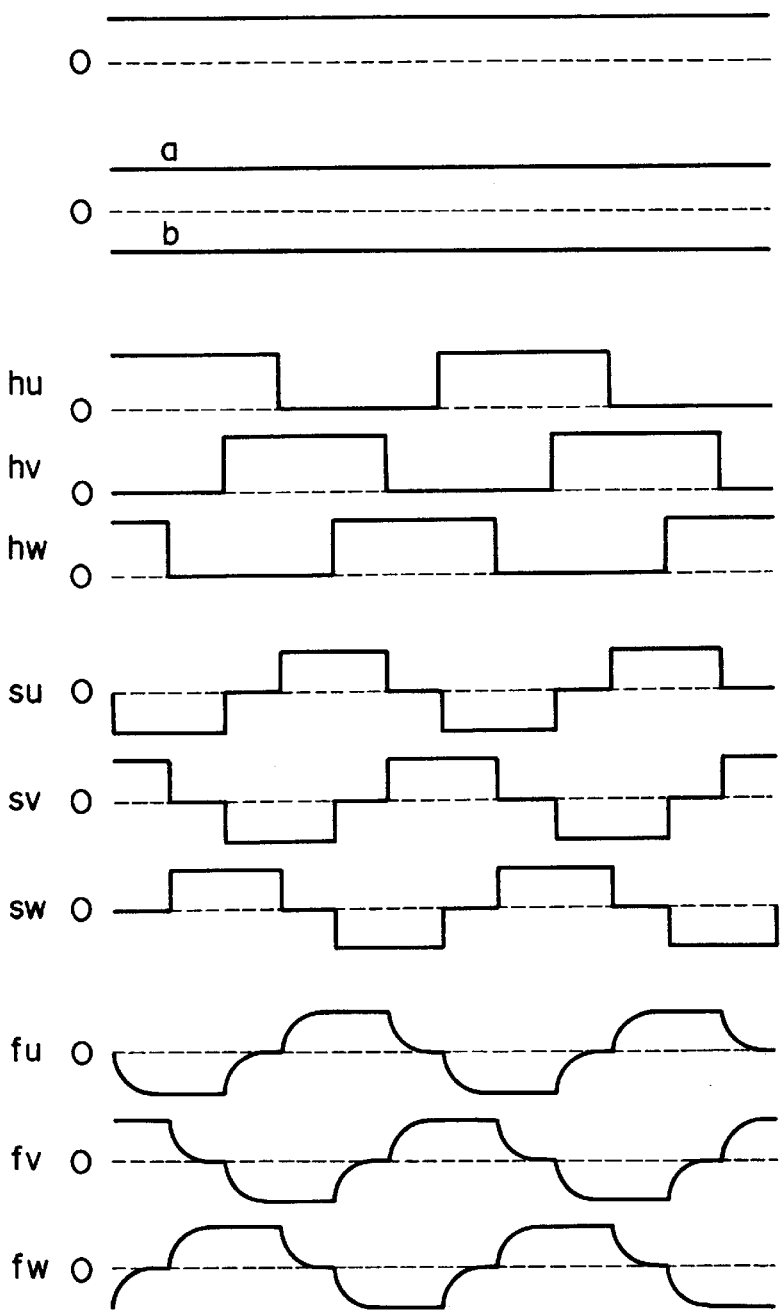
FIG. 2 illustrates an operation waveform of each part of embodiment 1.

The following describes a method for driving a motor using the inverter unit 3 shown in FIG. 1 with reference to a diagram of operation waveforms shown in FIG. 2. As is the case with position detecting signals hu, hv, hw shown in FIG. 2, a magnetic-pole position detecting signal group h (hu, hv, hw) during rotation of the motor 4 is a group of logical signals that keep a phase difference of 120 degrees in electrical angle. This position detecting signal group h (hu, hv, hw) has information relating to a motor speed (for example, a period of a pulse signal). Because of it, a direct-current voltage component corresponding to the actual speed is determined by selecting one position detecting signal hw from the position detecting signal group h (hu, hv, hw), and by converting the position detecting signal hw to a voltage using frequency-to-voltage converter (F/V) 15. In this connection, in the present invention, although the position detecting signal hw is used for speed detection, hu or hv may also be used, or a plurality of signals chosen from among hu, hv, and hw may also be used.

Means for speed control operation 13 (for example, a processor such as a microcomputer) compares the direct-current voltage component (that is, a speed signal), which is output of the frequency-to-voltage converter (F/V) 15, with a speed instruction stored in the means for speed control operation 13, and outputs a deviation obtained from them. This output signal is a direct-current voltage signal, which is referred to as current instruction signal a of the motor. An inverting amplifier 12 inverts a current instruction signal a to output a current instruction signal b. In addition, means for generating a midpoint 20 outputs a midpoint signal having an electric potential of which value is a median of electric potentials of the current instruction signals a and b. As shown in FIG. 2 and the after-mentioned FIG. 3, in this embodiment, an electric potential of the midpoint signal is a ground level (zero level). The current instruction signals a, b and the midpoint signal are input in signal selection means 11.

As input signals, the signal selection means 11 receives the current instruction signals a and b that are analogue signals, the midpoint signal with a ground level, and the position detecting signal group h (hu, hv, hw) that is logical signals. In response to the position detecting signal group h (hu, hv, hw), the signal selection means 11 selects one of the following: current instruction signals a, b and the midpoint signal. Then, the signal selection means 11 generates and outputs a selection signal group s (su, sv, sw) that becomes modulated waves of PWM control. Pulse edges of the selection signal group s (su, sv, sw) are synchronized with those of the position detecting signal group h (hu, hv, hw). For example, as shown in FIG. 2, rising and falling edges of a positive direction pulse of the selection signal su (when the current instruction signal a is selected) are synchronized with falling edge of the position detecting signal hu and falling edge of the position detecting signal hv respectively. In addition, rising (when changing from ground level to negative level) and falling (when returning from negative level to ground level) edges of a negative direction pulse of the selection signal su (when the current instruction signal b is selected) are synchronized with a rising edge of the position detecting signal hu and a risng edge of the position detecting signal hv respectively. In this connection, in a similar manner, edges of the selection signal sv are synchronized with edges of the position detecting signals hv and hw, and edges of the selection signal sw are synchronized with edges of the position detecting signals hw and hu. Moreover, a high level voltage of the selection signal group s (su, sv, sw) agrees with a voltage level of the current instruction signal a. On the other hand, a low level voltage agrees with a voltage level of the current instruction signal b. In this connection, a voltage level of the selection signal group s may also have a value proportional to a voltage level of the current instruction signals a and b.

The selection signal group s (su, sv, sw) is input to a filter circuit 10, which processes the selection signal group s so that a waveform of each selection signal becomes smooth. The filter circuit 10 outputs signals with smooth waveforms as selection signals fu, fv, fw. A comparator 9 compares the selection signals fu, fv, fw with a carrier wave signal (for example, a triangular wave), which is output of a carrier generator 14, to generate a PWM signal. The PWM signal is input to the inverter driving unit 8, which in turn controls on/off state of each switching element of the inverter unit 3.

The configuration described above controls a motor rotational speed so that the motor rotational speed agrees with a speed instruction given by the means for speed control operation 13. More specifically, when the motor rotational speed is lower than a value of the speed instruction, a value of the current instruction signal a is increased. This increases amplitudes of the selection signal group s (su, sv, sw) causing on-duty ratio of the PWM signal to increase. Accordingly, output current of the inverter unit 3 increases, which produces increased motor torque to accelerate the motor, resulting in the motor rotational speed that accords with the speed instruction value. When the motor rotational speed is higher than the speed instruction value, a value of the current instruction signal a is decreased. This performs the above-mentioned steps in reverse causing the motor to decelerate, which results in the motor rotational speed that accords with the speed instruction value.

In this embodiment, a motor current instruction signal, which is a direct-current voltage, is selected by a position detecting signal as appropriate, and rectangular modulated waves are generated for PWM control. Therefore, relatively simple PWM control can drive a brushless motor. Thus, because a driving circuit becomes simple, a brushless motor driving circuit can be miniaturized. In addition, the simplified circuit enables us to generate a PWM signal, which has been generated by the means for speed control operation (such as a microcomputer) in the prior art, in a control circuit that is integrally formed in the monolithic semiconductor integrated circuit 6 on which the inverter unit 3 is mounted. In other words, a PWM control circuit, an inverter driving unit (a driver circuit for switching element), and an inverter main circuit can be integrated in an one-chip monolithic IC. This can reduce a load of a processor such as a microcomputer, which performs various kinds of controls or state monitoring of the motor driving system. Accordingly, a small or low-cost processor can be used. In addition, if the semiconductor integrated circuit 6 incorporates a speed-instruction-value setting circuit and a circuit for generating the current instruction signal a as described above, the means for speed control operation 13 becomes unnecessary.

In this embodiment, a filter circuit smoothes waveforms of the selection signal group s (sv, su, sw). However, direct use of the selection signal group s (sv, su, sw) as modulated waves also provides smoother motor current waveforms than those provided by the 120-degree energizing method. In this embodiment, regarding an inverter-output-off period corresponding to 60 degrees in electrical angle for the 120-degree energizing method, not inverter-output-off but PWM control with a duty ratio of 50% is performed. Therefore, motor current flows during this period, contributing to smooth current waveforms. This is the reason why the motor current waveforms become smooth. In this connection, providing a filter circuit produces smoother current waveforms, which results in a lower motor noise.

Figure 3:
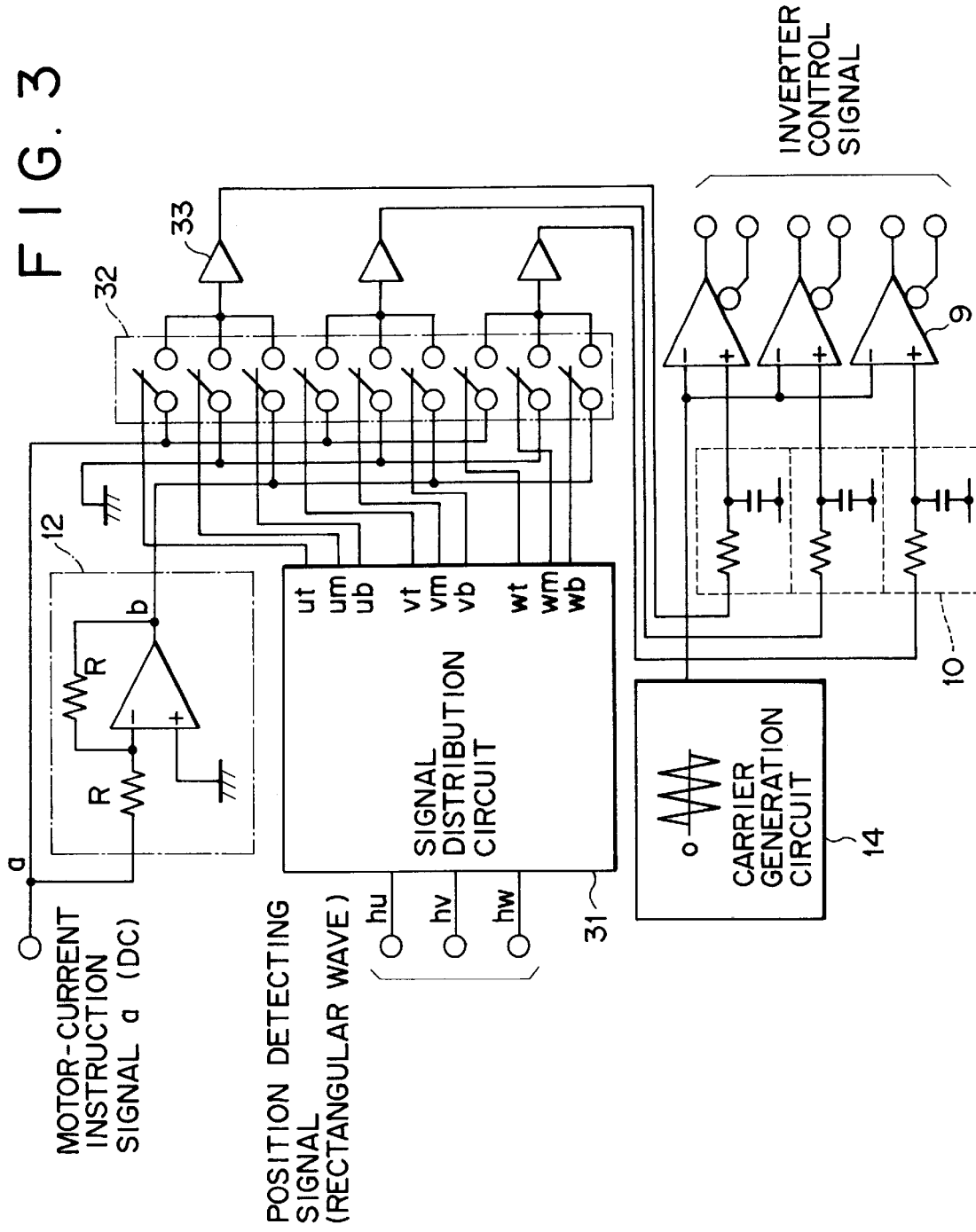
FIG. 3 illustrates a method for selecting an instruction signal according to embodiment 1.
Figure 4:
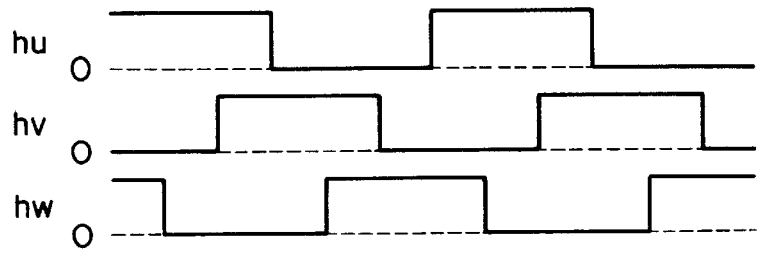
FIG. 4 illustrates input waveforms and output waveforms of a signal distribution circuit shown in FIG. 3.
Figure 4:
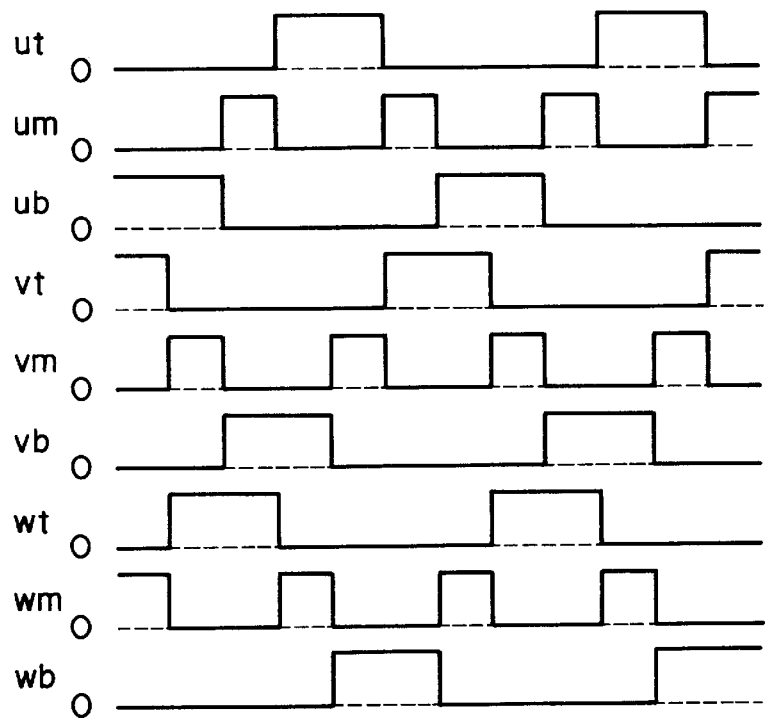

A method for selecting the current instruction signal of this embodiment is specifically described with reference to FIG. 3. In FIG. 3, position detecting signals hu, hv, hw as logical signals are distributed by a signal distribution circuit 31, and are output as driving signals ut, um, ub, vt, vm, vb, wt, wm, wb of an analogue switch group 32. FIG. 4 shows distribution signal waveforms. Corresponding to a high level, midpoint (ground) level, and low level of the selection signal su, the driving signals ut, um, ub become high level respectively. When ut, um, ub are at a high level, switches that are connected to the current instruction signal a, midpoint (ground) electric potential, current instruction b respectively are switched on. As a result, the selection signal su with a waveform shown in FIG. 2 is created. The other selection signal groups sv, sw are also created in the same manner. In such a manner, output signals of the signal distribution circuit 31 drive analogue switch group 32. Operation of the analogue switch permits a motor current instruction signal to be selected. The motor current instruction signal is input to an amplifier 33 to generate selection signals. Output signals of the amplifier 33 are input to the comparator 9 through the filter circuit 10. The comparator 9 compares the output signals with a carrier wave signal (in this embodiment, a triangular wave) to generate a PWM signal.

(Embodiment 2)

Figure 5:
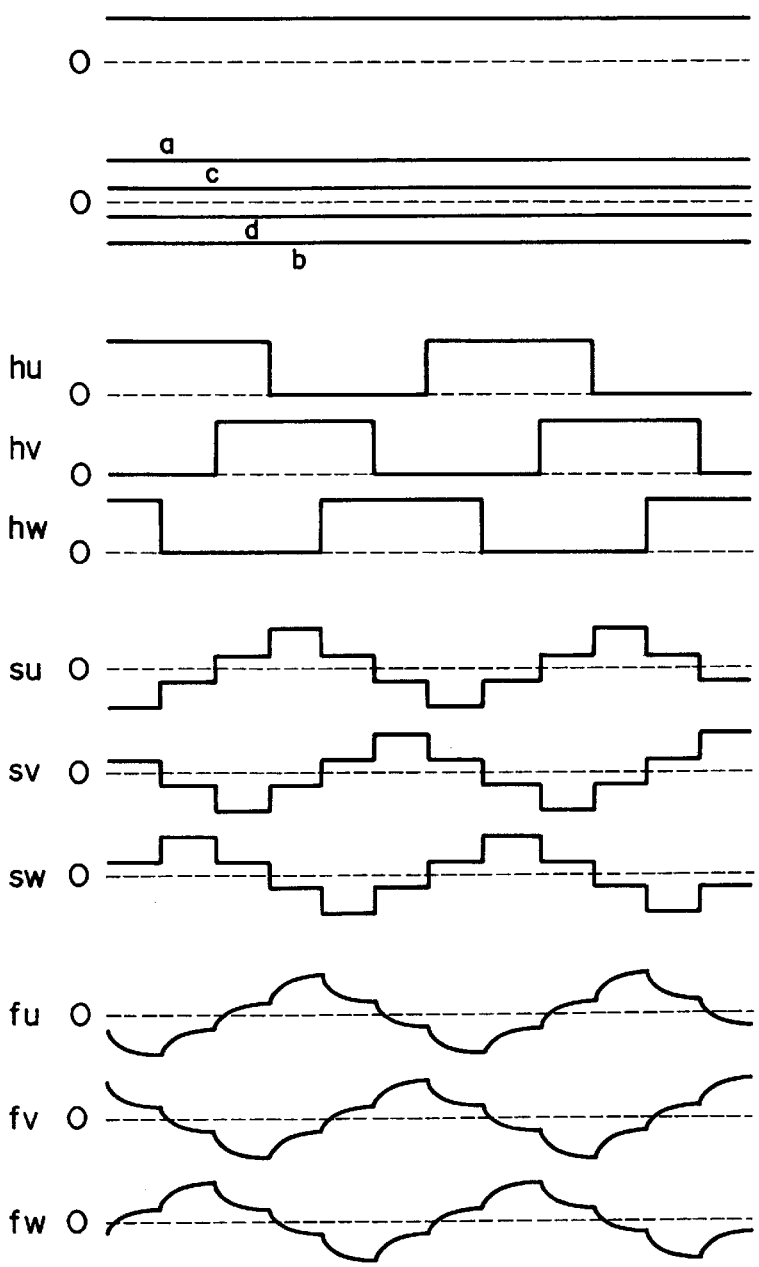
FIG. 5 illustrates an operation waveform of each part according to embodiment 2.

Embodiment 2 will be described with reference to FIG. 5. Although a drawing of the embodiment 2 is omitted, a driving system configuration of this embodiment is similar to that of the embodiment shown in FIG. 1. The difference between those embodiments is that a number of the current instruction signal levels to be selected is increased from three levels (a, ground, b) to four levels (a, c, d, b).

In the embodiment shown in FIG. 1, a selection signal for each phase is formed by a switching signal with 60 degrees+ 120 degrees, whereas in this embodiment a selection signal is segmented for each 60 degrees. In the first place, a selection signal group s is generated from current instruction signals and a position detecting signal group h. In this case, the current instruction signals are four direct-current levels a, b, c, d that have been converted from motor current instruction a.

Figure 6:
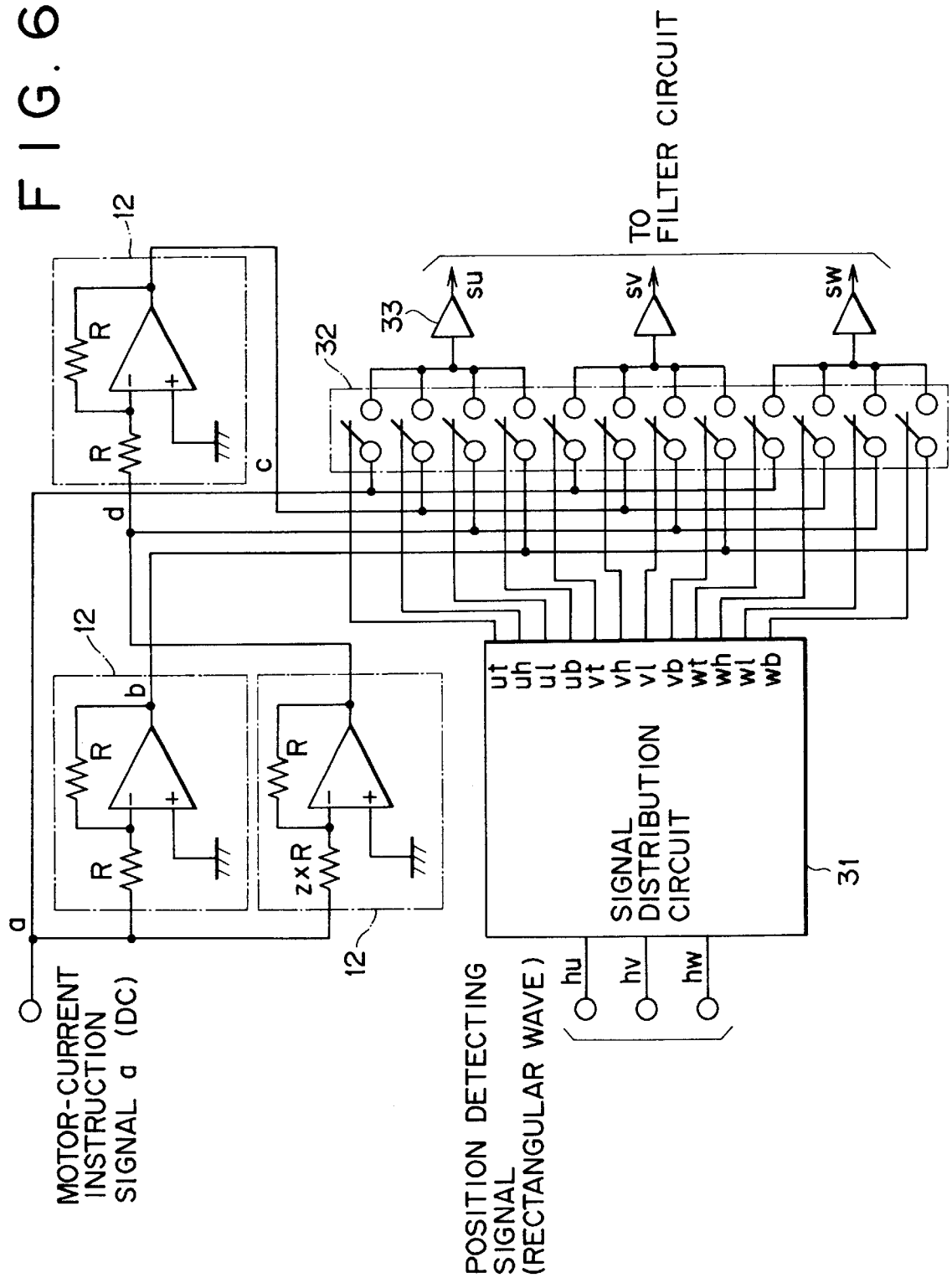
FIG. 6 illustrates a circuit configuration for generating selection signals according to embodiment 2.

FIG. 6 illustrates a circuit configuration for generating selection signals specifically. The current instruction signals a, b, c, d are generated in a manner shown in the following expression:

$$b=-a \qquad (1)$$

$$d=a/z \qquad (2)$$

$$c=-d \qquad (3)$$

where, z shows a gain. The gain z is adjusted so as to correspond to an inductive-voltage waveform level of a motor. For example, selection signals shown in FIG. 5 are compared with a sine wave. As regards level c, if level a is 1, a 30-degree position of the sine wave is an average position. The gain z, therefore, is determined by the following: sine 30 degrees=0.5. In this connection, for the purpose of smoothing waveforms of the selection signals, it is possible to adjust the value from 0.5 to about 0.3.

In FIG. 6, a signal distribution circuit has a logical configuration as shown in FIG. 7. The logical configuration is almost the same as that of the embodiment shown in FIG. 4. Corresponding to the four levels that decrease in turn from the highest level of the selection signal su shown in FIG. 5, each of signal distribution outputs ut, uh, ul, ub becomes high level. In response to the high levels ut, uh, ul, ub, each switch connected to each of the current instruction signals a, c, b, d is switched on. As a result, su shown in FIG. 5 is generated. The other selection signals sv, sw are also generated in the same manner. In such a manner, output signals of the distribution circuit are given to an analogue switch group 32 to select direct-current signals a, b, c, d. The selected signals are input to amplifier 33, of which output signals are input to a filter circuit.

According to this embodiment, resolution of the selection signals is increased, which produces the great effect of reducing a noise. By the way, in this embodiment, direct comparison of the selection signal group s with carrier waves without using the filter circuit also produces smooth motor current to some extent. Accordingly, removing the filter circuit eliminates the influence of the filter-circuit time constant, resulting in decrease of a noise over a wide range of rotational frequency.

The logical configuration shown in FIG. 7 can be automatically generated from the position detecting signals. However, a phase relation between the position detecting signals and the selection signals can also be shifted using a logical means. For example, if a phase difference of position detection between two operation points, at which a rotational frequency is extremely different from the other, is extremely large, it is possible to deal with such case by changing a logical configuration of the signal distribution circuit in the driving circuit of this embodiment. In this connection, the filter circuit shown in FIG. 3, which is a primary delay circuit with a simple configuration comprising resistors and capacitors, may be replaced with a filter circuit with a complicated configuration (for example, a multistage CR filter).

In this embodiment, the filter circuit 10 smoothes stepped signals using a frequency in response to a fixed time constant. Accordingly, motor current is smoothed at a specific motor rotational frequency. In addition, a time constant of the filter may also be changed in response to a rotational frequency. Therefore, if a variable time-constant filter is applied to a motor covering a wide range of rotational frequency for use, a noise is reduced while maintaining a motor efficiency.

(Embodiment 3)

Figure 8:
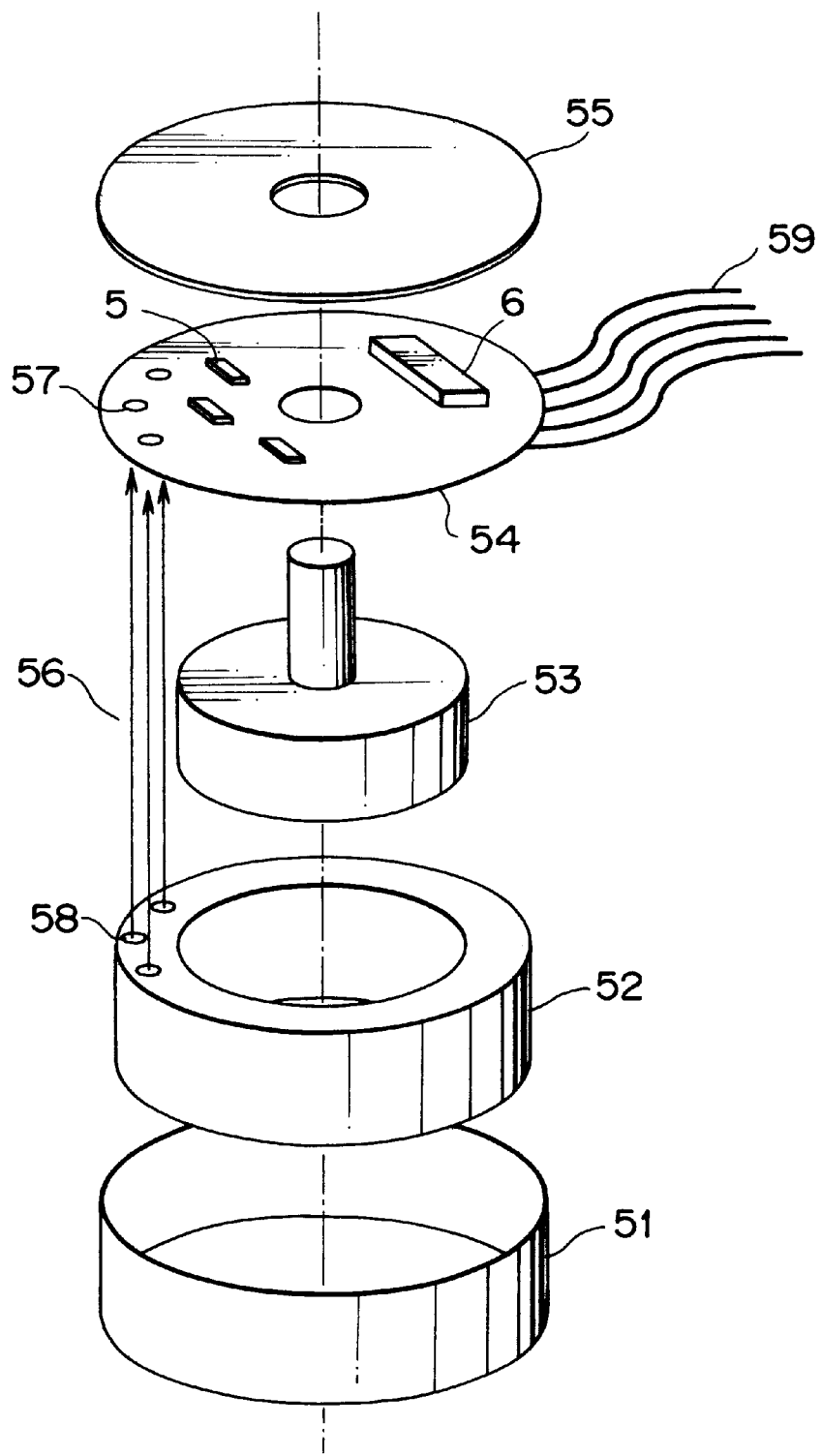
FIG. 8 illustrates a motor that incorporates a monolithic semiconductor integrated circuit according to embodiment 3.

In this embodiment, as shown in FIG. 8, the following advantages are provided if an inverter unit 6, which incorporates a monolithic semiconductor integrated circuit comprising the driving circuit described in the embodiments 1 and 2, is integrated into a motor monolithically.

(1) The inverter unit 6 can be incorporated in the motor because the inverter unit 6 can be miniaturized.

(2) Lead wiring can be omitted because the inverter unit 6 can be incorporated in the motor and whereby the need for carrying position detecting signals outside the motor is eliminated.

(3) Resistance to noise for an output-voltage dv/dt noise of the inverter unit can be increased because a distance between a position detecting circuit and the inverter unit is short, and because the position detecting signals are logical signals.

(4) Monolithic integration of the inverter unit improves an accuracy of gain of the inverter (and the like) that inverts a motor current instruction.

(5) It is generally known that increase of a motor load causes motor current phase to be delayed resulting in low motor efficiency. As the load increases, output current of the inverter becomes larger, causing the inverter 6 to be heated. Under such conditions, for the purpose of decreasing a time constant of the filter, negative temperature characteristic is given to resistors in the filter circuit, or negative temperature characteristic is given to capacitors in the filter circuit. Therefore, as the inverter unit 6 is heated, the current phase is more advanced, which contributes to temperature compensation that prevents the motor efficiency from becoming lower.

(6) Lead wiring from the motor can be simplified because one direct-current voltage signal can control the motor current instruction.

(7) It is known that when the motor rotational frequency increases, the phase tends to advance relative to a current phase that achieves the maximum motor efficiency. According to the present invention, it is possible to provide the filter circuit with characteristic that delays a current phase in response to increased rotational frequency. Because of it, decrease of the motor efficiency can be compensated.

As shown in FIG. 8, a stator 52 comprising motor winding is mounted to a motor enclosure 51. Winding input terminals 58 are attached to the stator 52. A permanent magnet rotor 53 is mounted inside the stator 52 while providing the permanent magnet rotor 53 with an appropriate gap to prevent the rotor 53 from contacting the stator 52. The monolithic semiconductor integrated circuit 6 that incorporates the inverter unit of this embodiment, the magnetic-pole position detector (Hall IC) 5 for detecting a magnetic pole position of the rotor, and substrate 54 having peripheral circuits are mounted on the rotor 53, which are additionally covered with enclosure 55. In addition, in FIG. 8, although the position detector 5 is shown on the surface (upward direction) of the substrate for convenience of description, the position detector 5 is actually mounted on the backside of the substrate to put it near the rotor for easier detection of a magnetic-pole position of the rotor. At this point, winding input terminals 58 on the stator side are connected to inverter output terminals 57 with wiring 56. Moreover, wiring 59 for driving the inverter is pulled out from the substrate 54. The minimum number of wiring required to drive the motor is five: the plus side of high voltage power supply for driving the motor; its minus side (ground), the plus side of control power supply for the monolithic integrated circuit; input signal for controlling motor current; and output signal of motor rotation. Thus, in this embodiment, the number of wiring can be significantly reduced as compared with the case where the motor driving circuit is mounted outside the motor enclosure.

(Embodiment 4)

Figure 9:
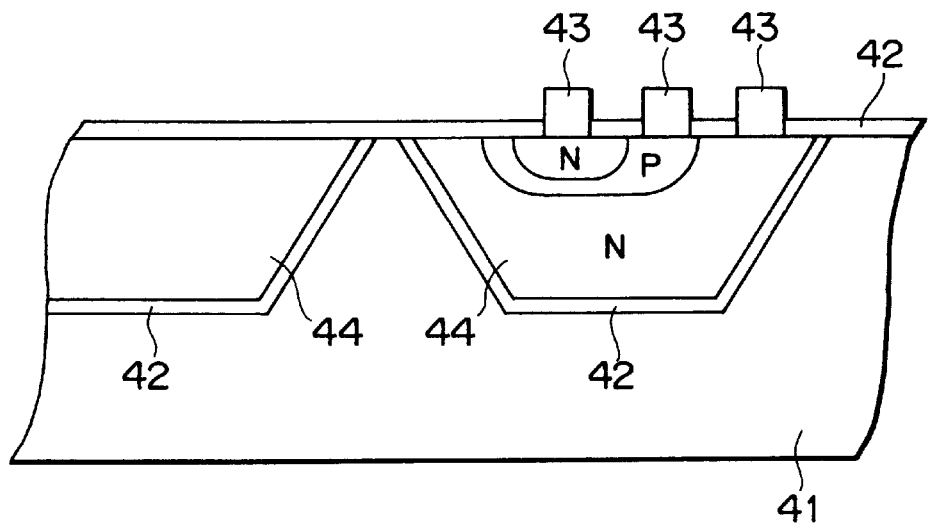
FIG. 9 illustrates a cross section of a dielectric separation substrate of a monolithic semiconductor integrated circuit according to embodiment 4.

FIG. 9 illustrates a cross section of a monolithic semiconductor integrated circuit, in which a motor driving circuit is formed, according to this embodiment. In this embodiment, the integrated circuit is formed above a dielectric separation substrate. In single crystal island 44 covered with a silicon oxide film ($SiO_2$) 42 that is a dielectric (insulator), are formed a semiconductor switching element (IGBT) that constitutes an inverter unit 3; a high speed diode; an inverter driving unit 8; electrical components that constitute a circuit for generating PWM signal; and the like. Those electrical components are connected to conductor wiring 43. Each single crystal island 44 is electrically isolated from the others by the silicon oxide film 42, and supported by a polycrystalline silicon substrate 41 that covers the single crystal island 44 and the silicon oxide film 42.

Figure 10:
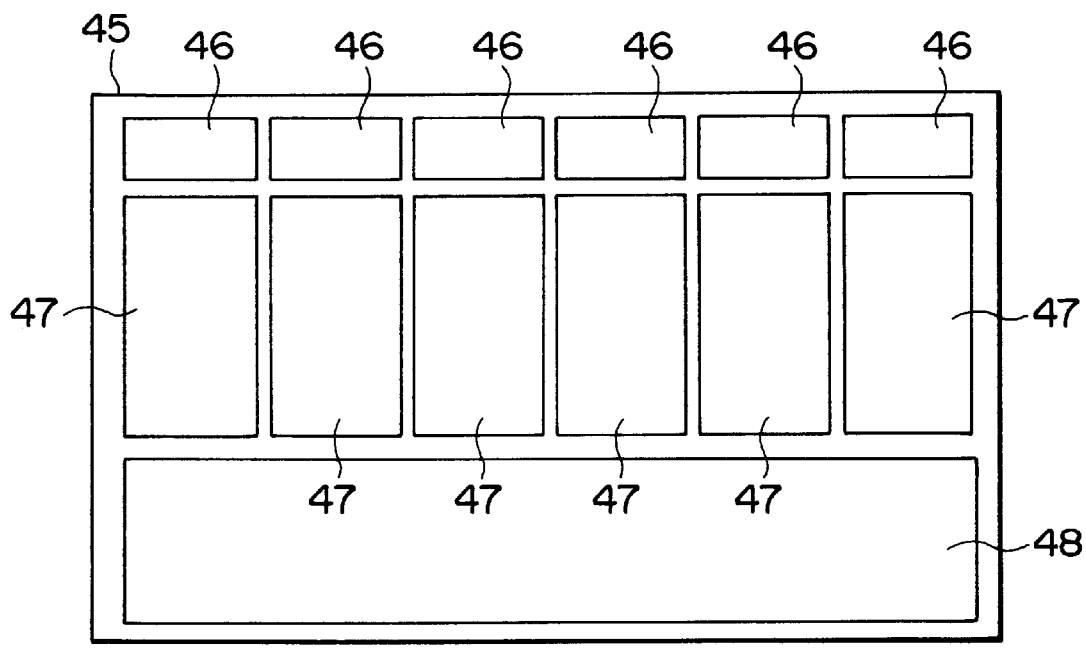
FIG. 10 illustrates a plane pattern of a monolithic semiconductor integrated circuit according to embodiment 4.

FIG. 10 illustrates a plane pattern of a monolithic semiconductor integrated circuit shown in FIG. 9. On a monolithic integrated-circuit chip 45, there are an area on which six high speed diode 46 are mounted in such a manner as to be adjacent to each other, and an area on which six IGBTs 47 are mounted in such a manner as to be adjacent to each other. Those semiconductor elements constitute the inverter unit. Adjacent to the area where the IGBTs are mounted, an inverter driving unit for controlling on/off state of those IGBTs and a circuit for generating PWM signal are formed above an area 48. Each circuit area is formed above the above-mentioned single crystal island 44 that is isolated from the substrate by the silicon oxide film 42. Because a circuit configuration of the area 48 is the same as those of the embodiments 1 through 3, the circuit configuration of the area 48 becomes relatively simple although the inverter driving unit and the circuit for generating PWM signal are included. This results in a small area occupied by the area 48 on a chip. Therefore, the inverter unit, the inverter driving unit, and the circuit for generating PWM signal can be embedded in a small size chip.

What is claimed is:

1. A driving circuit of a motor having winding of a stator and having a permanent magnet rotor, said motor driving circuit comprising:

a power converter for supplying the motor with pulse-width modulated driving power;

a means for detecting a magnetic-pole position of the rotor of the motor;

a means for detecting a rotational speed of the motor from output of the means for detecting a magnetic-pole position;

a means for outputting a deviation of the detected rotational speed of the motor from a speed instruction;

a means for generating a plurality of instruction signals in response to the deviation;

a signal selection means that selects one of the plurality of instruction signals according to the magnetic-pole position of the motor, and that outputs a selection signal group;

a means for generating modulated waves from the selection signal group and a carrier wave signal; and a means for controlling the power converter by means of pulse width modulation according to the modulated waves.

2. A motor driving circuit according to claim 1, wherein:
said plurality of instruction signals have a plurality of direct-current levels; and said modulated waves has levels that correspond to the direct-current levels.

3. A motor driving circuit according to claim 1, wherein:
a filter circuit is provided between output of the signal detection means and the means for generating modulated waves.

4. A semiconductor integrated circuit device, comprising in the same semiconductor substrate:
a semiconductor switching element for supplying a motor with pulse-width modulated power;
a means for generating a plurality of instruction signals in response to a deviation of a rotational speed signal of the motor from a speed instruction;
a means for selecting one of the plurality of instruction signals to generate modulated waves, in response to a magnetic-pole position detection signal of the motor; and
a means for controlling the semiconductor switching element by means of pulse width modulation according to the modulated waves.

5. A semiconductor integrated-circuit according to claim 4, wherein:
said semiconductor switching element formed above the same semiconductor substrate is isolated from a means for driving the semiconductor switching element by a dielectric insulator.

6. A semiconductor integrated-circuit according to claim 4, wherein:
said semiconductor switching element is an IGBT.

7. A motor driving system comprising:
a motor having a stator with winding and having a permanent magnetic rotor that is placed inside the stator;
a power converter for supplying the motor with pulse-width modulation controlled driving power;
a magnetic-pole position detector for detecting a magnetic-pole position of the motor rotor;
a speed detecting means for detecting a rotational speed of the motor according to an output signal of the magnetic-pole position detector;
a speed control operation means for outputting a deviation of an output signal of the speed detecting means from a speed instruction;
a means for generating a plurality of instruction signals in response to an output signal of the speed control operation means;
a means for generating modulated waves by selecting one of the plurality of instruction signals according to the output signal of the speed control operation means; and a means for controlling the power converter by means of pulse width modulation according to the modulated waves.

8. A motor driving system according to claim 7, wherein:
said motor is a three-phase brushless motor.

9. A motor driving system according to claim 7, wherein:
the magnetic-pole position detector is a Hall IC with a zero-crossing circuit.

10. A motor driving system according to claim 7, wherein:
above the same semiconductor substrate are formed: the power converter; the means for generating a plurality of instruction signals; the means for generating modulated waves by selecting one of the plurality of instruction signals; and the means for controlling the power converter by means of pulse width modulation.

11. A motor driving system according to claim 7, wherein:
said power converter is an inverter unit having a diode and an IGBT.

12. A motor comprising a stator with winding, a permanent magnetic rotor that is placed inside the stator, and an enclosure for accommodating the stator and the rotor, wherein the motor is driven by a driving circuit,
said driving circuit comprising:
a power converter for supplying the motor with pulse-width modulated driving power;
a means for detecting a magnetic-pole position of the rotor of the motor;
a means for detecting a rotational speed of the motor from output of the means for detecting magnetic-pole position;
a means for outputting a deviation of the detected rotational speed of the motor from a speed instruction;
a means for generating a plurality of instruction signals in response to the deviation;
a signal selection means that selects one of the plurality of instruction signals according to the magnetic-pole position of the motor, and that outputs a selection signal group;
a means for generating modulated waves from the selection signal group and a carrier wave signal; and
a means for controlling the power converter by means of pulse width modulation according to the modulated waves;
wherein said motor driving circuit is built into the enclosure.

13. A motor according to claim 12, wherein:
the following are formed above the same semiconductor substrate as a semiconductor integrated-circuit:
a semiconductor switching element for supplying the motor with pulse-width modulated power in the driving circuit;
a means for generating a plurality of instruction signals in response to a deviation of a rotational speed signal of the motor from a speed instruction;
a means for selecting one of the plurality of instruction signals to generate modulated waves, in response to a magnetic-pole position detection signal of the motor; and
a means for controlling the semiconductor switching element by means of pulse width modulation according to the modulated waves.

14. A motor according to claim 13, wherein:
the magnetic-pole position detector is placed nearer to the permanent magnet rotor than the semiconductor integrated circuit is to the permanent magnet rotor.

15. A method for driving a brushless motor using a power converter that is controlled by means of pulse width modulation, comprising the steps of:
- generating a deviation of a motor rotational speed, which has been generated from a magnetic-pole position detection signal group of a motor rotor, from a speed instruction;
- generating a plurality of instruction signals according to the deviation;
- selecting one of the plurality of instruction signals to generate modulated waves, according to the magnetic-pole position of the motor rotor; and
- controlling the power converter by means of pulse width modulation according to the modulated waves.

16. A driving circuit of a motor having winding of a stator and having a permanent magnet rotor, said motor driving circuit comprising:
- a power converter for supplying the motor with pulse-width modulated driving power;
- a magnetic-pole position detector that detects a magnetic-pole position of the rotor of the motor;
- a rotational speed detecting circuit that detects a rotational speed of the motor from output of the magnetic-pole position detector;
- a speed controller that outputs a deviation of the detected rotational speed of the motor from a speed instruction;
- an instruction signal generating circuit that generates a plurality of instruction signals in response to the deviation;
- a signal selection circuit that selects one of the plurality of instruction signals according to the magnetic-pole position of the motor, and that outputs a selection signal group;
- a circuit that generates modulated waves from the selection signal group and a carrier wave signal; and
- a driving circuit that controls the power converter by means of pulse width modulation according to the modulated waves.

17. A motor driving circuit according to claim 16, wherein said plurality of instruction signals have a plurality of direct-current levels; and said modulated waves has levels that correspond to the direct-current levels.

18. A motor driving circuit according to claim 16, further comprising a filter circuit provided between output of the signal selection circuit and the circuit that generates modulated waves.

19. A semiconductor integrated circuit device, comprising in the same semiconductor substrate:
- a semiconductor switching element for supplying a motor with pulse-width modulated power;
- instruction circuitry that generates a plurality of instruction signals in response to a deviation of a rotational speed signal of the motor from a speed instruction;
- selecting circuitry that selects one of the plurality of instruction signals to generate modulated waves, in response to a magnetic-pole position detection signal of the motor; and
- control circuitry that controls the semiconductor switching element by means of pulse width modulation according to the modulated waves.

20. A semiconductor integrated-circuit according to claim 19, wherein said semiconductor switching element formed on the same semiconductor substrate is isolated from a driving circuit for driving the semiconductor switching element by a dielectric insulator.

21. A semiconductor integrated-circuit according to claim 19, wherein said semiconductor switching element is an IGBT.

22. A motor driving system comprising:
- a motor having a stator with winding and having a permanent magnetic rotor that is placed inside the stator;
- a power converter for supplying the motor with pulse-width modulation controlled driving power;
- a magnetic-pole position detector for detecting a magnetic-pole position of the motor rotor;
- a speed detecting circuit that detects a rotational speed of the motor according to an output signal of the magnetic-pole position detector;
- a speed controller that outputs a deviation of an output signal of the speed detecting circuit from a speed instruction;
- an instruction signal generating circuit that generates a plurality of instruction signals in response to an output signal of the speed controller;
- a circuit that generates modulated waves by selecting one of the plurality of instruction signals according to the magnetic-pole position of the motor; and
- a driving circuit that controls the power converter by means of pulse width modulation according to the modulated waves.

23. A motor driving system according to claim 22, wherein said motor is a three-phase brushless motor.

24. A motor driving system according to claim 22, wherein the magnetic-pole position detector is a Hall IC with a zero-crossing circuit.

25. A motor driving system according to claim 22, wherein the power converter, the instruction signal generating circuit, the circuit that generates modulated waves, and the driving circuit are formed on the same semiconductor substrate.

26. A motor driving system according to claim 22, wherein said an inverter unit having a diode and an IGBT.

27. A motor comprising a stator with winding, a permanent magnetic rotor that is placed inside the stator, an enclosure for accommodating the stator and the rotor, and a motor driving circuit of claim 16, wherein said motor driving circuit is contained within the enclosure.

28. A motor according to claim 27, wherein the magnetic-pole position detector is placed never to the permanent magnet rotor than the semiconductor integrated circuit is to the permanent magnet rotor.

* * * * *